May 6, 1952  J. KAMPS  2,595,463
FISHLINE LEADER HOLDER
Filed May 22, 1950

INVENTOR
JOHN KAMPS
BY Liverance and
Van Antwerp
ATTORNEYS

Patented May 6, 1952

2,595,463

UNITED STATES PATENT OFFICE 2,595,463

FISHLINE LEADER HOLDER

John Kamps, Holland, Mich.

Application May 22, 1950, Serial No. 163,548

1 Claim. (Cl. 93—57.5)

This invention relates to a novel holder for fish line leaders.

In fishing, the leader lines which are attached at one end of long lengths of line, and which in themselves are short lines of generally lighter and stronger material than the main line, or of different material, have connected with each of them, a hook, or fish lure which includes a hook, and at times a weight for sinker purposes. Such leaders in numbers may be included in fishing equipment. Their maintenance in separated, untangled condition has been a problem, and one object and purpose of the present invention is to provide a holder for such leader lines in which they are kept separated and do not entangle with others, the hooks having their points maintained in a safe position and location, and if a leader line should be equipped with a sinker weight, it may be inserted within the holder and be out of the way.

The holder which I have provided is light in weight and accomplishes the results stated, satisfactorily in all respects.

Figure 1:
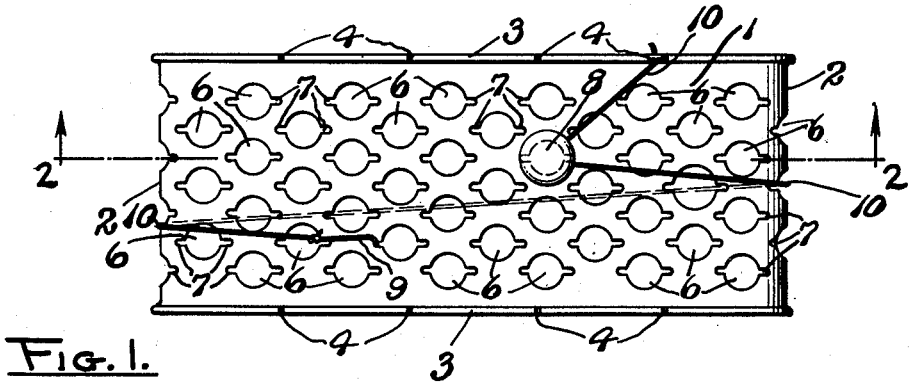

An understanding of the invention may be had from the following description taken in connection with the accompanying drawing, in which, Fig. 1 is a plan of the leader line holder, showing a leader line thereon.

Figure 2:
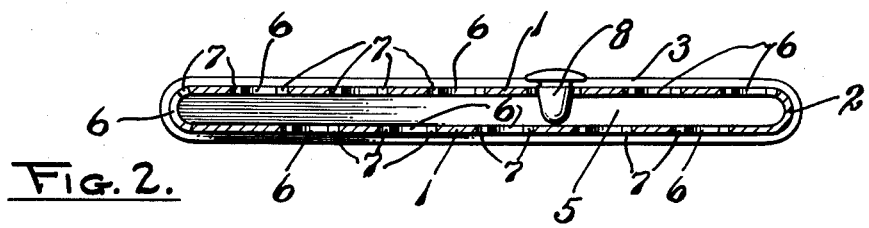
Figure 3:
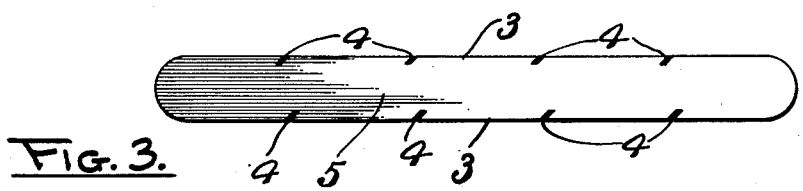
Figure 4:
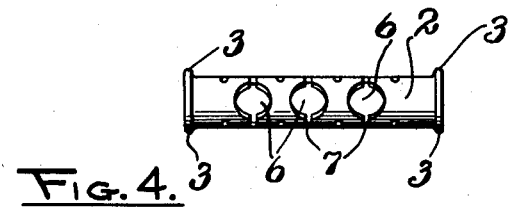
Figure 5:
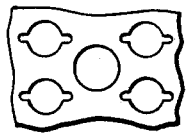

Fig. 2 is a longitudinal vertical section substantially on the plane of line 2—2 of Fig. 1, Fig. 3 is a side or edge view of the leader line holder, Fig. 4 is an end view of the leader line holder, and Fig. 5 is a fragmentary plan showing a slight addition.

Like reference characters refer to like parts in the different figures of the drawing.

In the structure of the leader line holder, a body is provided, having two spaced apart sides 1 integrally connected at their ends by U-shaped end bends 2. At each longitudinal edge of each side 1 and the curved ends 2, continuous flanges 3 are provided integral with the remainder of the body, in which spaced apart narrow notches or cuts 4, disposed at an angle to the length of the body, are cut as shown in Fig. 3. The longitudinal sides or edges of the body are closed by integral sides 5 with which the flanges 3 are integrally connected.

In the spaced sides 1 and around the curved ends 2 of the body a plurality of circular openings 6 are made which, while shown as transversely and longitudinally aligned, may be made in accordance with other desired patterns. Each of the openings 6 at diametrically opposed points have joining therewith short slots 7. Such slots 7 are aligned lengthwise of the body. A plug 8 or a number of them, of the form best shown in Fig. 2, may be inserted in a selected one or several of the openings 7.

The hook 9 of a leader line may be inserted in an opening 6 and drawn at its bend into a slot or notch 7 (Fig. 1) with the point of the hook within the body. The leader line 10 connected with the hook is wound around the body and is carried around the plug 8 which is forced into an opening 7, closing it frictionally engaging the edges of the opening. The free end of the leader line is then carried to a diagonal notch 4 and pulled thereinto, the sides of the notch gripping the end portion of the line. Several of the leader lines may be thus attached to the holder, with of course one of the plugs for each line.

In Fig. 5 a slight modification from the structure shown in Fig. 1 appears. A larger opening 11 may be made in any desired numbers in the opposed sides 1 of the holder, large enough so that a weight to act as a sinker may be passed through said opening to the interior of the body, the hook on the leader line being detachably connected in a notch 7 associated with one of the openings 6, and the line thereafter secured to the body in the manner described.

This leader line holder may be made of any suitable material, plastic or otherwise. With it leader lines are maintained separate and disentangled from each other. Any line may be removed. When more than one line is held on the holder the lines, so far as possible, will not be carried across each other. There may be, without any crossing of lines, one for each longitudinal series of the openings 6, seven of such longitudinal series being shown in Fig. 1.

The structure is economically produced, sturdy and durable, and serves as a holder for leader lines in a completely satisfactory manner. The invention is defined in the appended claim and is to be considered comprehensive of all forms of structure coming within its scope.

I claim:

A structure as described comprising, a hollow body having elongated, flat, spaced, generally parallel sides, integrally connected by curved ends and at opposite sides having parallel spaced integral closures to the body, said sides and ends having a plurality of openings therein into any of which a fishhook may be inserted and engaged, the pointed end of the look being within the body, said sides having additional larger openings, circular in outline, spaced from each other, a plug insertable into a selected larger opening frictionally engaging the sides thereof and extending into the space between the sides of the body, said plug having a head larger than said larger openings at the outer side of the body, around which plug a leader or line attached to a fishhook is adapted to be turned, and means on said closures with which the terminal end portions of fish lines or leaders are adapted to releasably connect and be held thereby.

JOHN KAMPS.

REFERENCES CITED

The following references are of record in the file of this patent:

UNITED STATES PATENTS

| Number | Name | Date |
|---|---|---|
| 742,040 | Kurtz | Oct. 20, 1903 |
| 1,133,542 | Deal | Mar. 30, 1915 |
| 1,397,790 | Tegner | Nov. 22, 1921 |
| 1,490,370 | Figley | Apr. 15, 1924 |
| 1,578,631 | Bolton | Mar. 30, 1926 |
| 2,488,160 | Behr | Nov. 15, 1949 |
| 2,493,344 | Hamel | Jan. 3, 1950 |

FOREIGN PATENTS

| Number | Country | Date |
|---|---|---|
| 43,015 | Sweden | of 1917 |